United States Patent [19]

Hayes et al.

[11] 4,027,821

[45] June 7, 1977

[54] SOLAR HEATING/COOLING SYSTEM

[75] Inventors: William Roger Hayes, Deerfield; Satoru Shikasho, Chicago, both of Ill.

[73] Assignee: International Telephone and Telegraph Corporation, New York, N.Y.

[22] Filed: July 18, 1975

[21] Appl. No.: 597,282

[52] U.S. Cl. .............................. 237/1 A; 126/271; 126/400; 122/37; 126/362
[51] Int. Cl.² ......................................... F24J 3/02
[58] Field of Search .............. 237/1 A, 8 R, 59, 66; 126/271, 362, 400; 62/2; 122/37; 165/36, 40; 219/314

[56] References Cited

UNITED STATES PATENTS

| | | | |
|---|---|---|---|
| 1,425,174 | 8/1922 | Cartter et al. | 237/1 A X |
| 2,469,496 | 5/1949 | Christenson | 237/1 A |
| 3,799,145 | 3/1974 | Butterfield | 237/1 A X |
| 3,918,430 | 11/1975 | Stout et al. | 237/1 A X |

*Primary Examiner*—William E. Wayner
*Assistant Examiner*—William E. Tapolcai, Jr.
*Attorney, Agent, or Firm*—James B. Raden; William J. Michals

[57] ABSTRACT

A heliothermal heating and cooling system of the type using a heat transport fluid such as water is disclosed. The energy collector comprises an assembly of individual solar collector panel modules in a series/parallel configuration and function to heat water flowing therethrough. Each solar collector panel includes a pair of stepped headers respectively disposed at its input and output portions and which function to reduce water flow resistance therethrough. The input and output headers communicate with an insulated water storage tank by way of return and supply lines, respectively. A pump is provided in the return line to circulate the water through the system upon receipt of a command signal. The storage tank communicates with a thermal energy utilization device and includes an integral, internal expansion chamber to accomodate expansion of the water. The storage tank is stratified by means of baffles, and the strata are interconnected by a selector valve under the control of a differential temperature detector thereby to assure that the hottest available water is presented to the utilization device. The danger of freezing is avoided and the need for anti-freeze additives or solutions is eliminated by means of a vent line which connects the expansion chamber at the top of the storage tank to the top of the energy collector assembly and functions to drain the energy collector assembly of its water charge when the pump is de-energized.

14 Claims, 5 Drawing Figures

SOLAR HEATING/COOLING SYSTEM

BACKGROUND OF THE INVENTION

This invention relates to heliothermal energy conversion systems and, more particularly, to systems of the type wherein a heat transport fluid is forced to circulate between a solar energy collection area and a thermal energy utilization device.

Heliothermal energy conversion systems are known in the art and generally include a solar water heater or collector panel of the flat-plate collector type. The solar collector panels generally include an outer cover of glazing which may be one or more sheets of glass or other radiation-transmitting material. The collectors include inlet and outlet ducts or headers which are interconnected by conduits in the form of tubes or fins for conducting or directing the heat transfer fluid across the surface of a collector plate. The conduits are coupled to the collector plate in thermal contact therewith so that the incident solar energy heats the water flowing through the conduits. The underside of the collector plate is provided with a layer of insulation to minimize downward heat loss, and the entire solar panel is enclosed in a frame or casing which surrounds the above-mentioned components and permits solar energy to pass through the glazing material.

To date, such solar collector panels have been utilized in thermosyphone heaters comprising a storage vessel or tank mounted at a level higher than the level of the solar collector, and supply and return lines which connect the storage tank to the solar collector panel. The solar panels, which are disposed at an optimum angle to the incident radiation of the sun, function to heat the water in the conduits or tubes of the collector plate and the warm water flows upwardly through the collector panels and into the storage tank. This system utilizes the tendency of warmer water in a closed system to rise to a higher level than the colder water therein. However, where architectural or other considerations necessitate that the storage vessel or tank be mounted below or at a considerable distance from the solar collectors, a forced circulation system must generally be employed.

These prior art systems have several known disadvantages. For example, relatively large pumps must be provided in order to compensate for the fluid pressure drop appearing across the solar collector panels. Accordingly, the larger pumps increase the initial and operating costs of the system. Further, since the heated water is collected in a hollow homogeneous storage tank, the instantaneous hottest hot water is not always directly available for the heating and/or cooling functions. That is, during those periods when the sun's radiation is not strong enough to keep the collector panels hot, relatively cold water enters the storage tank; and, if the inlet is in close proximity to the energy utilization device, the hotter water in other portions of the tank is not available for the energy utilization device. Conversely, when the water being supplied by solar collector assembly is hotter than the average temperature of the water stored in the tank, the hottest water is also available to the utilization device as it is diluted by the other colder water.

Another known disadvantage of these prior art heliothermal systems is that a costly anti-freeze solution or additive must be provided to avoid any damage that might occur due to freezing in the system plumbing. Accordingly, the heat transfer between the solar collectors and the heat-transfer fluid is reduced due to the lower coefficient of heat transfer of the anti-freeze solution, and the use of common anti-freeze additives such as ethylene glycol can accelerate corrosion of system components. Further, the viscosity of these anti-freeze solutions is substantially higher than water alone and, accordingly, required a larger and more costly pump size. Additionally, anti-freeze solutions provide a significant disposal problem from an environmental consideration viewpoint; and, the danger of contamination of the source of domestic or potable water is undesirably present.

Another known disadvantage of these prior art systems is the difficulty of installation and maintenance of these solar collector panels due to their relatively large size and integral construction. That is, routine maintenance such as the replacement of a broken glazing panel necessitates, in many cases, a complex disassembly of the entire solar collector panel assembly.

These and other disadvantages are overcome by the present invention wherein there is provided a new solar energy conversion system of the type having a heat transport fluid circulating therein. In the system of the present invention, pressure drop across the solar collector panel is significantly reduced; and, means are provided for assuring that the hottest available water is presented to the thermal energy utilization device. Further, a vent line is provided between the solar collector panel(s) and the storage tank which functions to return or dump the fluid into the storage tank in the event that the ambient temperature at the solar energy collection area drops below a predetermined value and/or when the system pump is turned off. Thus, the danger of damage caused by water freezing in the solar collector panel and/or interconnecting lines is eliminated as is the need for anti-freeze solutions. Still further, the design of the solar collector panel assembly facilitates installation and maintenance as it is capable of being partially disassembled without necessitating breaking down the entire assembly.

SUMMARY OF THE INVENTION

Briefly, a solar energy conversion system of the type wherein a heat transport fluid is forced to circulate between a solar energy collection area and a thermal energy utilization device is provided. The system includes at least one solar collector panel receptive of solar radiation and including an inlet header and an outlet header with a plurality of conduits extending across the surface of the panel and providing passageways interconnecting the headers. Accordingly a fluid circulating through the panels is heated by the solar radiation. An insulated storage vessel for receiving the fluid is provided and includes first and second portions and is adapted for coupling to the utilization device at the first portion of the vessel. A supply line is connected at one end thereof to the outlet header of the collector panel and the supply line is adapted for coupling to the storage vessel at its other end thereof. A return line is connected at one of its ends thereof to the inlet header of the collector panel and the return line is connected to the second portion of the storage vessel at a point remote from the first portion of the storage vessel. Means cooperating with the return line are provided for pumping the fluid from the storage vessel and through the collector panel; and means are provided for alternately connecting the supply line to one of the first and second portions of the storage vessel.

BRIEF DESCRIPTION OF THE DRAWING

The advantages of this invention will become more readily appreciated as the same becomes completely understood by reference to the following detailed description when taken in conjunction with the accompanying drawing wherein.

Figure 1:
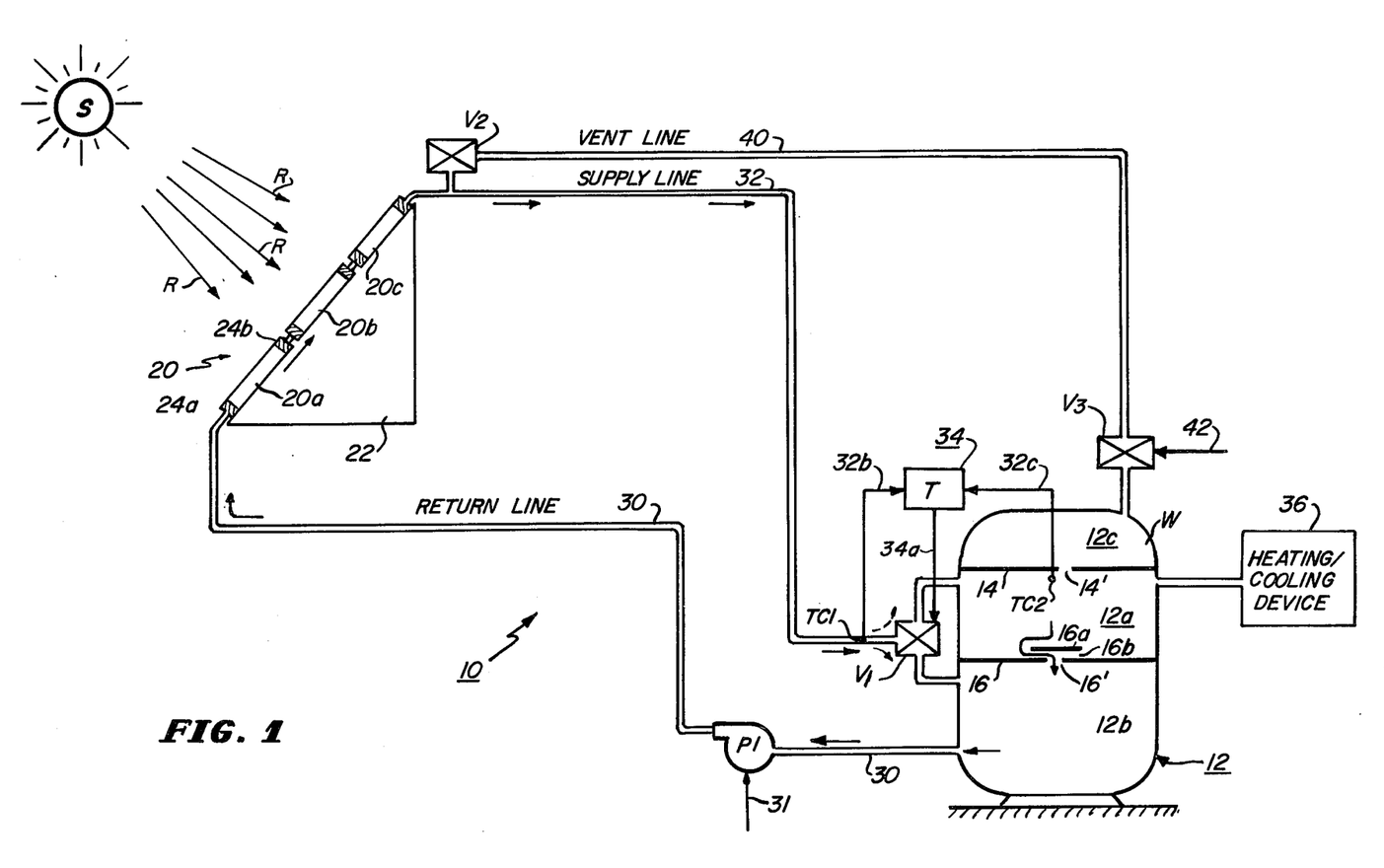
FIG. 1 is a combined graphic and schematic representation of the solar energy conversion system in accordance with the present invention.

DETAILED DESCRIPTION OF THE DRAWINGS:

Turning now to FIG. 1, there is shown a combined pictorial and functional diagram of a solar energy system 10 in accordance with the principles of the present invention. System 10 includes a storage vessel 12 which may take the form of a boiler tank or any other suitable vessel for containing a heat transport fluid. Tank 12 is divided into portions 12a, 12b and 12c by means of baffes 14 and 16. Baffle 14 is generally continuous except at a relatively small central aperture 14' therein. Baffle 16 is similarly provided of a continuous construction except at an aperture 16' at a central portion thereof. Disposed above baffle 16 in a spaced apart relationship therewith is a secondary baffle 16a which is supported on baffle 16 by means of legs 16b. Vessel 12 contains a predetermined volume of a heat transport fluid such as water W. As described more fully hereinafter, portion 12c forms an expansion chamber and the level of water W is ideally maintained just above baffle 14.

System 10 of FIG. 1 further includes a solar energy collector 20 mounted about a suitable elevated structure 22 so that the energy collecting surface of collector 20 is suitably disposed to the incident rays R provided by the sun S. Collector 20 is shown comprising three serially connected solar collector panels 20a, 20b and 20c. Each solar panel includes an input header 24a and an output header 24b as will be described in greater detail hereinafter. The lower portion of collector 20 communicates with and is connected to vessel 12 by way of a return line 30 having a centrifugal pump P1 disposed therebetween. It can be seen that return line 30 is connected to vessel 12 at the lower area of portion 12b. The output header or output portion of collector 20 is connected to a supply line 32 which, in turn, is coupled to tank 12 by way of three-way, two-position valve V1. Valve V1 alternately connects supply line 32 to the upper area of portion 12a of tank 12 or to the upper area of portion 12b of tank 12. Valve V1 operates under the control of differential temperature detector 34 which provides an output signal on line 34a as determined by the input signals provided at inputs 32b and 32c. Inputs 32b and 32c are respectively coupled to sensors TC1 and TC2; and detector 34 functions to divert the supply line in such a manner so that the hottest available water is presented to a thermal energy utilization device 36 which is also coupled to the upper area of portion 12a of tank 12.

Thermal utilization device 36 may comprise one or a combination of devices which utilize the stored thermal energy of the heat transport fluid W in tank 12. For example, device 36 may include a heat exchanger or heating coil which receives hot fluid from tank 12 for use in a conventional forced air heating system. Device 36 may also comprise or include an absorption refrigeration system for cooling or air conditioning purposes. Of course, device 36 may comprise a closed loop hot-water heating system wherein the heat transport fluid W in tank 12 is circulated throughout a given structure or building and wherein heat is radiated from the closed system by means of suitable fins disposed about selected surfaces of the hot-water distribution plumbing.

A vent line 40 is connected between the uppermost area of the expansion chamber portion 12c of tank 12 and the upper or outlet portion of collector 20. Vent line 40 is connected to collector 20 by means of a check-valve V2; and vent line 40 is connected to tank 12 by means of a solenoid operated valve V3 which operates under the control of a signal provided at the input depicted as arrow 42. Valve V3 functions to positively open and close vent line 40 in response to the control signal provided at input 42. Valve V2 is preferably a pressure and fluid responsive self-actuated valve which closes when a fluid of a given pressure is present in supply line 32, and which opens when the pressure of the fluid in supply line 32 drops below a given level or in the absence of a fluid in supply line 32. Thus, Valve V2 is responsive to the presence of fluid rather than an external control signal as is Valve V3. As will be discussed more fully hereinafter, the function of vent line 40 is to provide an air passageway between expansion chamber portion 12c of tank 12 and the solar collector 20 such that when the air passageway is provided by opening valve V3 the heat transport fluid will be drained by gravity from collector panel 20, return line 30 and supply line 32, thereby to drain or dump the system.

The operation of solar energy system 10 of FIG. 1 is described as follows:

It will be assumed that initially the system has been drained wherein all of the heat transport fluid or water W is substantially within tank 12 and perhaps the immediately adjacent plumbing structure of supply and return lines 30 and 32. That is, vent line 40 has been previously opened at valve V3 and the solar collector 20 has been completely drained by gravity. An input signal provided at input 31 of pump P1 starts or energizes pump P1 and forces water W to circulate from tank 12 through pump P1 up to and into collector 20. As forced water W gradually fills the internal cavities of collector 20 the displaced air is allowed to vent into supply line 32 and into the upper tank compartment 12c or the lower compartment 12b depending upon the position of the selector valve V1. The vented air then "bubbles" up through openings 16' and 14' provided in the tank baffles 16 and 14 respectively. The air is then accumulated in the expansion chamber 12c.

The water leaving collector 20 is prevented from bypassing into the vent line 40 by check valve V2. To prevent re-admission of air into the supply main 32 at the junction of vent line 40 and supply main 32, solenoid valve V3 positively closes vent line 40 after a predetermined delay period such as 15 seconds. This is done to allow any water that may have entered into vent line 40 through check valve V2 during its closing process to drain back, by gravity, into the expansion chamber 12c.

As water W circulates through collector 20 it is heated by the incident radiation of the sun's rays (R). The heated water W is supplied to tank 12 wherein it is utilized by device 36 for heating and/or cooling purposes. In actual practice the temperature differential between the lower area of portion 12b of tank 12 (e.g., at return line 30) and the heated water (e.g., at TC1) is detected and a signal is provided to control input 31 of pump P1. As long as a temperature differential is maintained above a predetermined value such as, for example, 3°, pump P1 continues to circulate water W through the closed system. Thus, any intermittent cloud cover which may reduce the heated temperature of fluid W will not shut down the system as long as the predetermined temperature differential is maintained. However, continued loss of solar energy such as at sunset, will cause the temperature differential between TC1 and return line 30 to drop below the predetermined temperature level at which time the input signal provided at input 31 will cause pump P1 to stop. When input signal stops pump P1 the same or a related signal causes solenoid valve V3 to open to permit free-gravity draining of collector 20. Accordingly, a situation where fluid or water W could freeze in the collector 20 during the evening hours is avoided. Similarly, anytime pump P1 is caused to stop for any other reason, the fluid or water W is likewise drained from the system and dumped into storage tank 12. Thus, the need for antifreeze additives or solutions is avoided.

The function and structure of valve V1 in combination with differential temperature detector 34 will now be described in detail. When the detected temperature of the heated water coming from collector 20 at TC1 greater than the temperature of the water W in the upper region of portion 12a of tank 12 as detected at TC2, the flow of the water W in the supply line is diverted into portion 12a of tank 12. If, however, the temperature at TC1 drops below the temperature at TC2, the flow from collector 20 is directed into the lower portion 12b of tank 12. Thus, this structural configuration assures that the hottest available water temperature is presented to thermal utilization device 36. This has the advantage that if the heated water W from supply line 20 and is detected at TC1 is significantly hotter than the stored water W in tank 12, device 36 is essentially directly coupled to the hottest available water and is therefore permitted to operate at its maximum efficiency or with a maximum temperature differential as long as the "super" heated water is available. Accordingly, it is not necessary to wait until the average temperature of an otherwise completely hollow and homogeneous storage tank is at a sufficiently high level before maximum effective thermal energy utilization can be provided. Thus, the hottest instantaneous water can advantageously be utilized essentially independently of the average or mean temperature of the total volume of stored water. It should now be appreciated that differential temperature detector 34 and valve V1 together with the structure of tank 12, in accordance with the present invention, provide temperature stratification wherein the hottest water layers are presented to the thermal energy utilization device. A further advantage of this stratification technique, in accordance with the principles of the present invention, is that varying water temperatures from collector 20 during the intermittent sunshine periods will not dilute the high-temperature water previously accumulated in stratified layers in portion 12a of storage vessel 12.

As previously alluded to, storage vessel 12 is provided with a third portion or expansion chamber 12c. This expansion chamber eliminates the need for a separate compression tank and the interconnecting plumbing necessitated thereby. The compression chamber allows for temperature differential expansion of heat transport fluid or water W and provides a ready reservoir for the fluid or water W being dumped from collector 20 when vent line 40 is open and pump P1 is not running.

Figure 2:
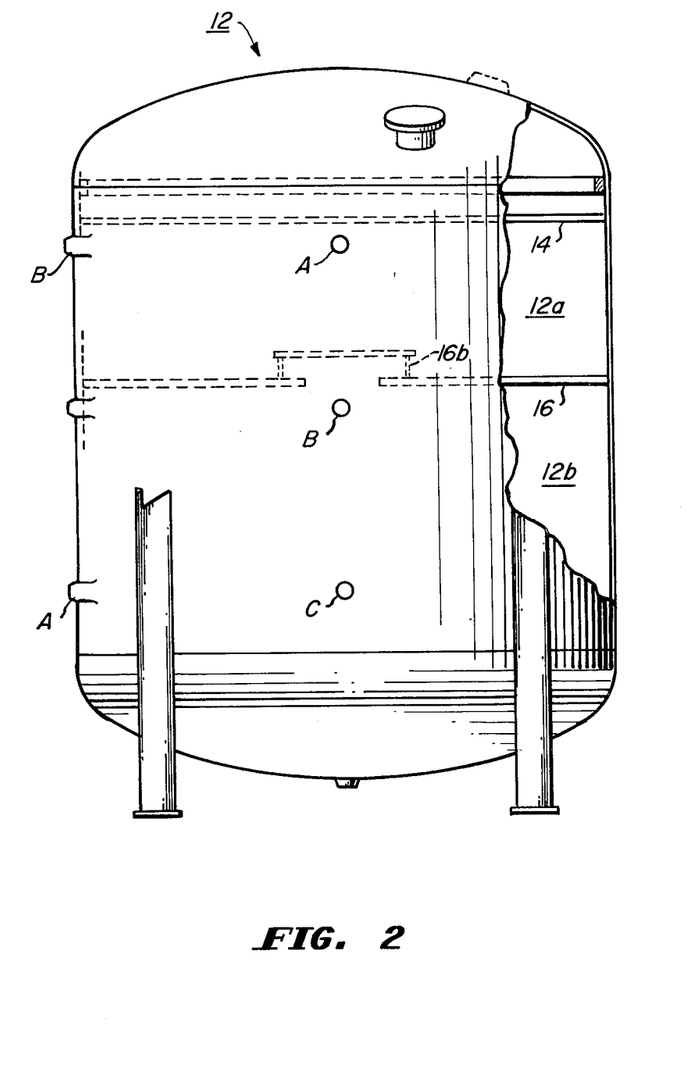
FIG. 2 is an elevation view in partial section of a preferred storage vessel or tank for use in the system illustrated in FIG. 1.

Referring now to FIG. 2 there is shown a plan elevation view in partial section of a preferred insulated storage vessel in accordance with the principles of the present invention. Vessel 12 of FIG. 2 takes the form of a conventional steel tank in its outward appearance. In currently preferred practice storage tank 12 of FIG. 2 is insulated with four 1-inch layers of sheet insulation wherein the sheet insulation is applied with staggered joints and the joints are covered with glass mesh and the external joints are finally covered with an insulation type paint.

It can be seen that baffles 14 and 16 are suitably bonded or welded to the inner surface of tank 12 and that holes A and B are provided to accept the outputs of three-way valve V1; and hole C is provided to accommodate return line 30. Thermocouple TC2 and any other desired instrumentation may be coupled to tank 12 in any suitable manner as is well known in the art. Finally, thermal utilization device 36 may be similarly coupled to tank 12 in any suitable manner to accomodate a given device configuration.

It can be seen by reference to FIGS. 1 and 2 that baffles 14 and 16 function to keep water W stratified within the tank 12, with the hottest water at the top of the tank. It should be noted that secondary baffle 16a functions to substantially eliminate any vertical flow paths within the tank. That is, secondary baffle 16a promotes horizontal flow of water W in directions parallel to baffle 16 rather than perpendicular to it. Thus, stratification of water W, in layers of varying temperature, with the hottest layers in proximity to the thermal energy utilization device is enhanced.

Figure 3:
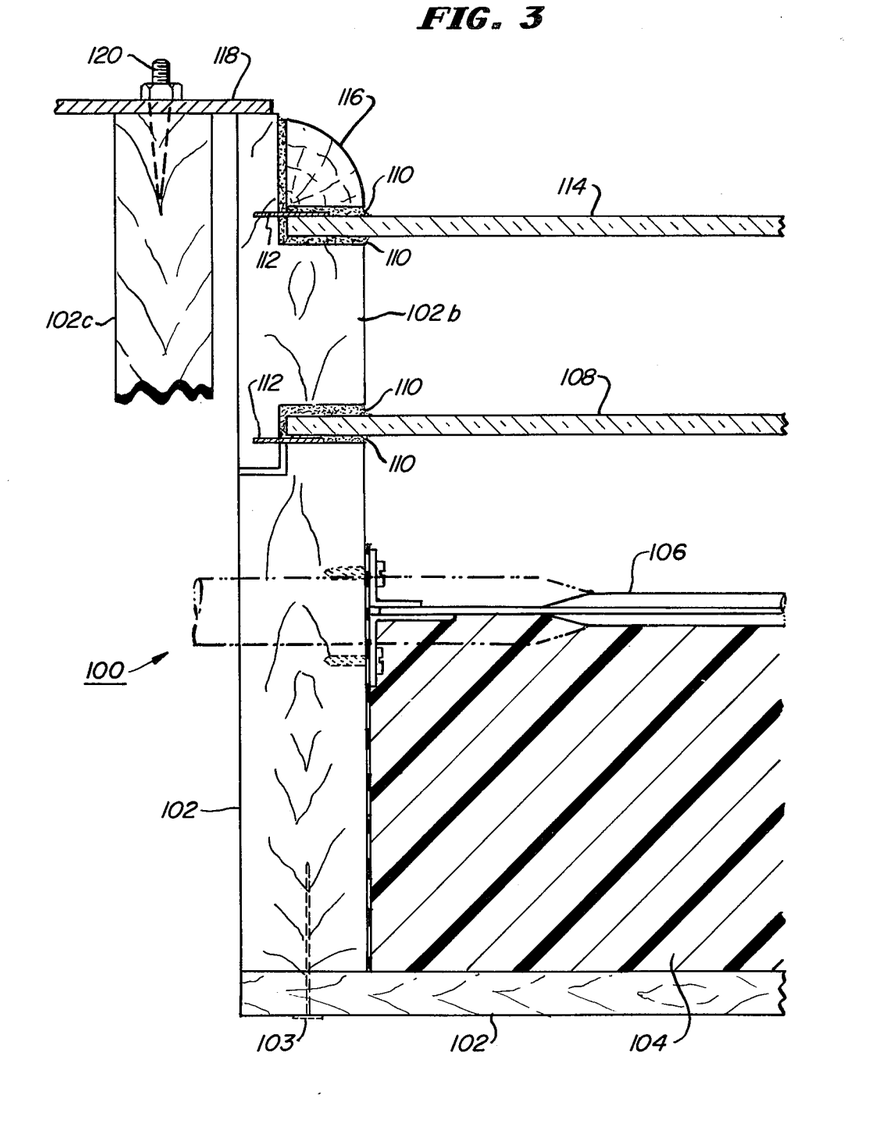
FIG. 3 is a side elevation view of a preferred solar panel module assembly for use in the system in accordance with the present invention.

Referring now to FIG. 3 there is shown a partial side elevation view of a preferred solar collector panel module assembly 100 for use in the system in accordance with the present invention. Module 100 of FIG. 3 includes a housing or frame 102 of wood or any other suitable structural material which is fastened together by means of a fastener such as a nail 103. Module 100 further includes a layer of insulation 104 between frame 102 and collector plate 106. Disposed above collector plate 106 is a first panel 108 of glazing material, such as glass. The edge portions of panel 108 are supported upon a first portion of frame 102 and bonded thereat by means of a suitable material such as putty 110. Glazing wedges 112 may also be used to facilitate installation of panel 108. Removably mounted over frame 102 is a separable section 102b. Section 102b also carries a second layer of glazing material such as panel 114. Panel 114 is fastened to section 102b by means of a conventional glazing wedge 112 and a molding trim 116. Of course, glazing putty or its equivalent may also be used to fasten panel 114. Module 100 is fixedly assembled by means of a fixed frame portion 102c and hold-down panel 118. Hold-down panel 118 is removably fastened to fixed frame member 102c, for example by means of a suitable threaded fastener 120.

It should now be appreciated that solar collector panel module 100 is preferably providedas a two-piece or two subassembly construction. That is, glazing panels 114 and 108 and removable section 102b of frame 102 are readily separated from the module by removing hold-down panel 118. This has the advantage that replacement of the outer and inner glazing panels readily can be accomplished without necessitating disassembly or breaking down of the entire module assembly. Further, the separate component parts of the module may be individually and sequentially assembled during the initial installation. It should now be appreciated that such a sub-assembly construction affords a reduction in weight which simplifies installation. Further, access may be had to the solar collector plate without disturbing the connecting plumbing of the supply and return lines of the overall system. Thus, an individual glazing panel may readily be replaced after the same is damaged, for example, by a foreign object such as a stone or hail, or by thermal expansion.

Figure 4:
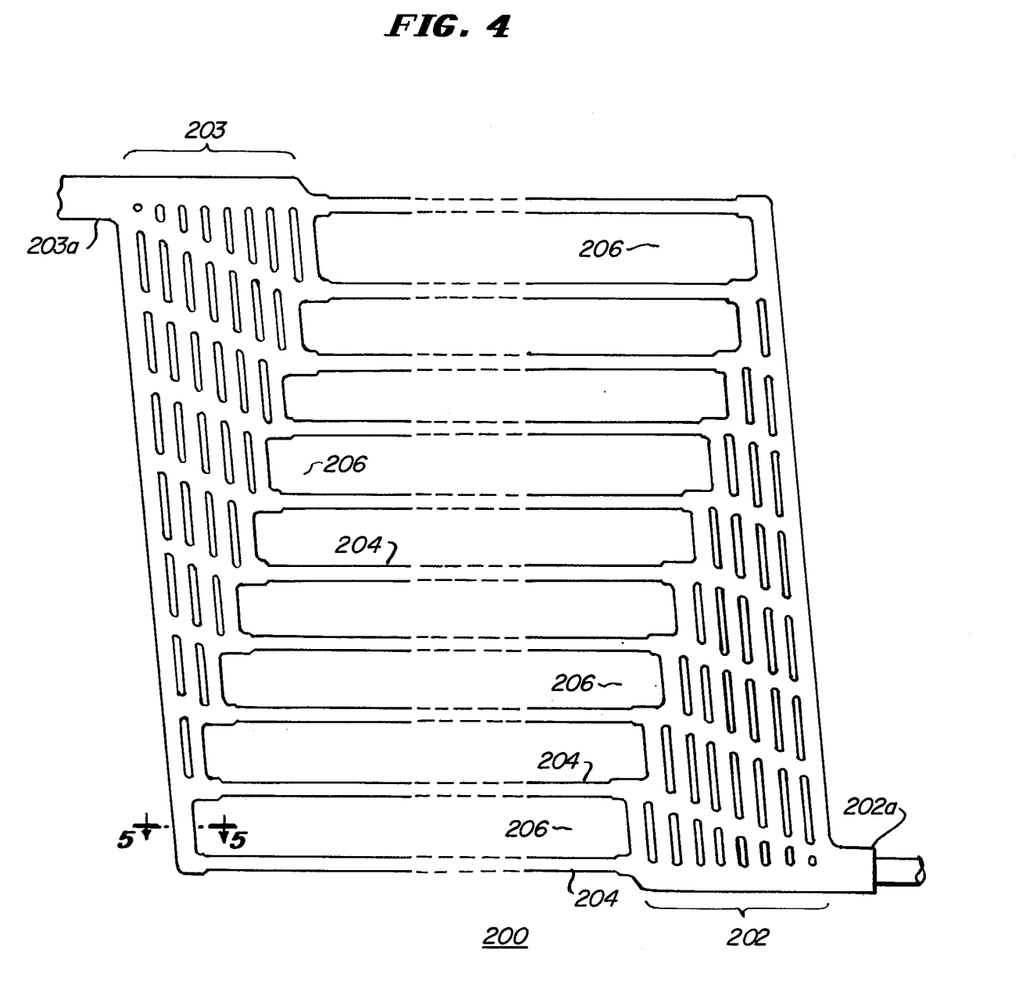
FIG. 4 is a plan view of the solar panel illustrating the novel header construction used therein; and, FIG. 5 is a cross-sectional view taken along the line 5—5 of FIG. 4.
Figure 5:
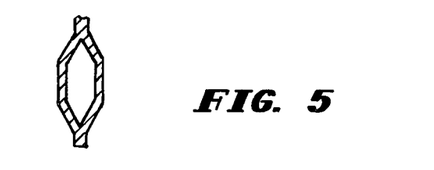

Referring now to FIGS. 4 and 5 there are shown plan and sectional views of a preferred solar panel collector plate 200 in accordance with the principles of the present invention. Collector plate 200 preferably includes symmetrical input and output portions designated at 202 and 203 in FIG. 4. Portions 202 and 203 are respectively connected to delivery tubes 202a and 203a which facilitate coupling to the supply and return lines of the system. Portions 202 and 203 form headers which are interconnected by a plurality of conduits 204 disposed about the generally flat surface portion 206 of plate 200. It will be appreciated by those skilled in the art that conduits 204 may take the form of any suitable geometry and need not be limited to the form illustrated and described herein.

It can be seen by reference to FIGS. 4 and 5 that the fluid flow through the header portions of plate 200 is divided into a number of paths corresponding to the number of the plurality conduits 206. It can also be seen that although the height of collector panel 200 is essentially uniform, the division of the fluid flow is occasioned by the stepped or stepped structure of the transition section of the header. That is, each "pipe" of the stepped structure provides a separate fluid path for its respective conduit and the flow of the fluid through the panel is substantially equally divided between the conduits. It will be appreciated by those skilled in the art that in prior art systems the conduits disposed furthest from the delivery tubes of the input and output portions of the headers typically receive a reduced fluid flow because the resistance or pressure to fluid flow increases in proportion to the distance from the associated delivery tube. Consequently, the overall effect of this is to increase the pressure drop across the collector panel. It should now be appreciated that since a reduction in pressure drop is provided in accordance with the principles of the present invention depicted in FIGS. 4 and 5, the overall pumping burden of the pumps of the system is substantially reduced, thereby facilitating the use of simpler and more economical circulating pumps.

It will be appreciated by those skilled in the art that collector plate 200 of FIGS. 4 and 5 may be constructed from aluminum, copper or any other suitable material. The collector plate can be fabricated as an integral rolled structure as depicted herein or by any other suitable means such as attaching individual members to a flat plate. In practice the external surface of collector plate 200 is coated with a black or other suitable heat absorbing material. The heat absorbed by collector plate 200 is conducted through conduits 204 and to the heat transport fluid circulating therein.

In one constructed embodiment of the system in accordance with the present invention 24 solar panel modules with a corresponding number of collector plates 200 were provided. The modules were divided into eight groups each group having three serially connected modules therein. The input tubes of each group were commonly connected to a single return line and the output tubes were respectively connected to eight parallel supply lines which were, in turn, commonly connected at the storage tanks. The total energy collecting surface area was 540 sq. ft. and the cooperating storage vessel or tank had a capacity of 800 gallons of heat transport fluid. The system substantially accommodated the heating and cooling requirements — including auxilliary heating of domestic hot water — of a medium size office area. For example, the system interfaced with a three-ton "water-fired" lithium bromide absorption air-conditioner.

What has been taught, then, is a solar energy conversion system of the type wherein a heat transport fluid is forced to circulate between a solar energy collection area and a thermal energy utilization device. The system facilitates, notably, the presentation of the hottest available water to the energy utilization device; a vent line technique wherein the possibility of freeze damage to the system is eliminated; a readily installed and serviceable solar panel module assembly; and, a solar panel collector plate wherein the pressure flow drop across the plate is minimized. The forms of the inventions illustrated and described herein are but preferred embodiments of these teachings. They are shown as illustrations of the inventive concepts, however, rather than by way of limitation, and it is pointed out that various modifications and alterations may be indulged in within the scope of the appended claims.

What is claimed is:

1. A solar energy conversion system of the type wherein a heat transport fluid is forced to circulate between a solar energy collection area and a thermal energy utilization device comprising, in combination:

at least one solar collector panel receptive of solar radiation, said panel including an inlet header and an outlet header with a plurality of conduits extending across the surface of said panel and providing passageways interconnecting said headers, whereby a fluid circulating through said panel is heated by said solar radiation;

an insulated storage vessel for receiving said fluid, said vessel having first and second portions and said vessel being adapted for coupling to said device at said first portion of said vessel;

a supply line connected at one end thereof to said outlet header of said collector panel and said supply line being adapted for coupling to said storage vessel at its other end thereof;

a return line connected at one end thereof to said inlet header of said collector panel and said return line being connected to said second portion of said storage vessel at a point remote from said first portion of said storage vessel;

means cooperating with said return line for pumping said fluid from said storage vessel and through said collector panel; and, means for alternately connecting said supply line to one of said first and second portions of said storage vessel.

2. The solar energy system according to claim 1, wherein said headers of said solar panel each include progressively stepped flow guide means wherein the flow of said fluid through said panel is substantially equally divided between said conduits.

3. The solar energy system according to claim 1, including a vent line connection between said output header of said solar panel and said storage vessel and further including valve means serially coupled with said vent line for alternately opening and closing said vent line.

4. The solar energy system according to claim 3, wherein said storage vessel includes an expansion chamber portion adjacent said first portion for receiving said fluid from said solar panel when said valve means opens said vent line.

5. The solar energy system according to claim 1, wherein said storage vessel includes an expansion chamber adjacent said first portion and remote from said second portion to accommodate expansion of said fluid.

6. The solar energy system according to claim 1, wherein adjacent ones of said portions of said storage vessel are separated by a baffle.

7. The solar energy system according to claim 1, wherein said means for connecting said supply line to said first and second portions of said storage vessel includes a differential temperature sensor, and a selector valve coupled between said portions and said supply line wherein said fluid is diverted into said first portion when the temperature of the fluid in said supply line is less than a predetermined value with respect to the temperature of said fluid in said first portion.

8. The solar energy system according to claim 1, wherein said solar panel includes first and second removably mounted radiation-transmitting covers, each cover being mounted substantially parallel to said surface of said panel and disposed between said panel and the source of said solar radiation.

9. The solar energy system according to claim 1, including: a vent line connected between said output header of said panel and said storage vessel; and valve means serially coupled with said vent line for alternately opening and closing said vent line, and, wherein said fluid is $H_2O$.

10. The solar energy system according to claim 9, wherein said valve means is responsive to said means for pumping for opening said vent line when said means for pumping is stopped.

11. The solar energy system according to claim 10, wherein the sea-level freezing temperature of said water is substantially 32° F.

12. The solar energy system according to claim 1, wherein $3n$ solar collector panels are provided, where $n$ is an integer greater than zero, and said panels being arranged in $n$ parallel groups wherein each of said groups includes three serially connected panels.

13. A solar energy conversion system of the type wherein a heat transport fluid is forced to circulate between a solar energy collection area and a thermal energy utilization device comprising, in combination:

at least one solar collector panel receptive of a solar radiation, said panel including an inlet header and an outlet header with a plurality of conduits extending across the surface of said panel and providing passageways interconnecting said headers, whereby a fluid circulating through said panel is heated by said solar radiation;

an insulated storage vessel for receiving said fluid, said vessel being adapted for coupling to said device at an upper portion of said vessel;

a supply line connected at one end thereof to said outlet header of said collector panel and said supply line being adapted for coupling to said storage vessel at its other end thereof;

a return line connected at one end thereof to said inlet header of said collector panel and said return line being connected to said storage vessel at a point remote from said upper portion or said storage vessel;

means cooperating with said return line for pumping said fluid from said storage vessel and through said collector panel;

means for stratifying said fluid within said storage vessel into layers of varying temperature between said upper portion and said remote point; and, means for connecting said supply line to said storage vessel so that the hottest layer of fluid in said storage vessel is coupled to said device.

14. The solar energy system according to claim 13, wherein said means for connecting said supply line to said storage vessel includes a differential temperature detector and a valve having an input coupled to said supply line, said valve having at least first and second outputs coupled to first and second portions of said storage vessel and said valve being responsive to said detector for diverting the said fluid into said first portion when the temperature of the fluid from said collector panel is greater than the temperature of said hottest fluid layer.

* * * * *

UNITED STATES PATENT OFFICE
CERTIFICATE OF CORRECTION

Patent No. 4,027,821   Dated June 17, 1977

Inventor(s) William Roger Hayes et al.

It is certified that error appears in the above-identified patent and that said Letters Patent are hereby corrected as shown below:

Column 9, line 15, "connection" should read -- connected --.

Column 9, line 50, after "said" insert -- solar --.

Signed and Sealed this

Sixth Day of September 1977

[SEAL]

Attest:

RUTH C. MASON
*Attesting Officer*

LUTRELLE F. PARKER
*Acting Commissioner of Patents and Trademarks*